(12) United States Patent
Shayne et al.

(10) Patent No.: US 11,875,571 B2
(45) Date of Patent: Jan. 16, 2024

(54) SMART HEARING ASSISTANCE IN MONITORED PROPERTY

(71) Applicant: ObjectVideo Labs, LLC, Tysons, VA (US)

(72) Inventors: Ethan Shayne, Clifton Park, NY (US); Donald Gerard Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 127 days.

(21) Appl. No.: 17/306,545

(22) Filed: May 3, 2021

(65) Prior Publication Data

US 2021/0368279 A1 Nov. 25, 2021

Related U.S. Application Data

(60) Provisional application No. 63/027,426, filed on May 20, 2020.

(51) Int. Cl.
| | | |
|---|---|---|
| *G06V 20/52* | (2022.01) | |
| *H04W 8/00* | (2009.01) | |
| *G06T 7/70* | (2017.01) | |
| *G10L 25/51* | (2013.01) | |
| *G10L 17/06* | (2013.01) | |

(Continued)

(52) U.S. Cl.
CPC ............... *G06V 20/53* (2022.01); *G06T 7/70* (2017.01); *G10L 17/06* (2013.01); *G10L 25/51* (2013.01); *G10L 25/78* (2013.01); *H04W 8/005* (2013.01); *G06F 18/00* (2023.01); *G06T 2207/30201* (2013.01)

(58) Field of Classification Search
CPC .......... G06V 20/53; G06V 20/52; G06T 7/70; G06T 2207/30201; G10L 17/06; G10L 25/51; G10L 25/78; H04W 8/005; G06K 9/00; H04R 25/554; H04R 25/43; G06F 18/00
See application file for complete search history.

(56) References Cited

U.S. PATENT DOCUMENTS

2015/0296308 A1\* 10/2015 Fluckiger ............... H04R 25/30
715/733
2016/0182435 A1\* 6/2016 Landqvist ............... H04L 51/52
709/204
2018/0109889 A1\* 4/2018 Kang .................. H04R 25/558
(Continued)

*Primary Examiner* — Syed Haider
(74) *Attorney, Agent, or Firm* — Fish & Richardson P.C.

(57) ABSTRACT

Methods, systems, and apparatus, including computer programs encoded on computer-storage media, for emphasizing a portion of audio data. In some implementations, a method may include determining that a first person is wearing a hearing aid, determining, from images captured by a camera, that a second person is speaking to the first person, determining an audio stream for an environment in which the first person is located, determining whether more than one sound stream is encoded in the audio stream, based on determining that more than one sound stream is encoded in audio data, identifying a portion of captured sounds that corresponds to the second person speaking to the first person, and providing, to the hearing aid, audio data that increases a volume of the portion of captured sounds relative to other portions of the captured sounds.

18 Claims, 4 Drawing Sheets

(51) Int. Cl.
*G10L 25/78* (2013.01)
*G06F 18/00* (2023.01)

(56) References Cited

U.S. PATENT DOCUMENTS

2019/0349683 A1* 11/2019 Anders .................... H04R 5/04
2022/0021985 A1* 1/2022 Wexler .................... G10L 25/51

* cited by examiner

# SMART HEARING ASSISTANCE IN MONITORED PROPERTY

CROSS-REFERENCE TO RELATED APPLICATIONS

This application claims the benefit of U.S. Provisional Application No. 63/027,426, filed May 20, 2020, which is incorporated by reference in its entirety.

BACKGROUND

People can sometimes have difficulty hearing conversations, whether due to hearing loss or because of an amount of background noise. For instance, at social events when different people speak in different conversations at the same time, a person with hearing loss can have difficulty hearing the conversation in which they are involved. Sometimes people with hearing loss can use hearing aids to help them hear a conversation.

SUMMARY

Some hearing aids are small, simple devices that just amplify surrounding sound. But when the hearing aid amplifies all incoming sound indiscriminately, a person wearing the hearing aid can still have difficulty participating in a conversation. For instance, surrounding noise, such as other nearby conversations or background music, can make it difficult for the person to distinguish the voice of another person speaking to them from the surrounding noise. Further, some hearing aids are constrained to fit in the user's ears. This can limit a hearing aid's acoustic properties, audio analysis capability, e.g., computer processing power, or both.

An analysis system can communicate with sensors included in a smart home to improve audio content provided to a person wearing a hearing aid. The audio content can include a stream of audio data for the people with whom the person is speaking, text data, e.g., closed captions, or both.

For example, the analysis system can receive data from a smart home that may have multiple cameras and smart speakers. The analysis system can use video analytics, or another appropriate process, to detect a person in a room of a smart home who is wearing a hearing aid, e.g., by analyzing a video stream received from a camera in the smart home. The analysis system can use video analytics to recognize which people in a room who are participating in conversations with which other people, e.g., conversation groups.

The analysis system can use video analytics, audio analytics, or both, to create an isolated audio stream for each person. The analysis system can combine the isolated audio streams with information about who is talking to whom, e.g., the isolated audio streams for each person in a conversation group. The analysis system is then able to pipe only the relevant audio stream(s) to the hearing aid, e.g., to improve the sound of the speech for the people with whom the person is speaking. Specifically, the analysis system can pipe the audio streams for the people in the conversation group that includes the person to the person's hearing aid.

In some implementations, the analysis system can process data for multiple hearing aids. For instance, when the analysis system detects multiple people in a room who are each wearing separate hearing aids, the analysis system can isolate the conversations for each of the people with hearing aids.

The subject matter described in this specification can be implemented in various embodiments and may result in one or more of the following advantages. In some implementations, an analysis system can extract and provide a hearing aid with data about a conversation in which a person wearing the hearing aid is participating from data for multiple different conversations, background noise, or both. The data can include a text representation of the conversation, an audio stream that emphasizes audio data for the conversation, or both. An audio stream that emphasizes audio data for the conversation can include an audio stream that includes only audio data for the conversation, e.g., with background noise and data for other conversations substantially muted, or an audio stream that increases the volume of the audio data for the conversation compared to other sounds encoded in the audio stream.

In some implementations, isolating an audio stream on a per-speaking-person basis can provide for near-real-time language translation, near-real-time transcription, or both. For instance, a system that isolates an audio stream on a per-speaking-person basis can generate more accurate translations, more accurate transcriptions, or both, compared to other systems. More accurate translations transcriptions can include using a transcription engine that is customized to a speaker, a transcription that automatically attributes which statements were spoken by which person, or both. In some implementations, a system that isolates an audio stream on a per-speaking-person basis can more accurately focus a camera on the person who is speaking compared to other systems. The more accurate focus can include zooming in on the speaker, following the speaker when the speaker is moving, or both, compared to other systems.

In some implementations, a system that isolates an audio stream on a per-speaking-person basis can more accurately determine a likely intended recipient of the audio stream than other systems. For instance, the system can determine whose attention the speaker is trying to get and provide at least a portion of the audio stream to the likely intended recipient.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
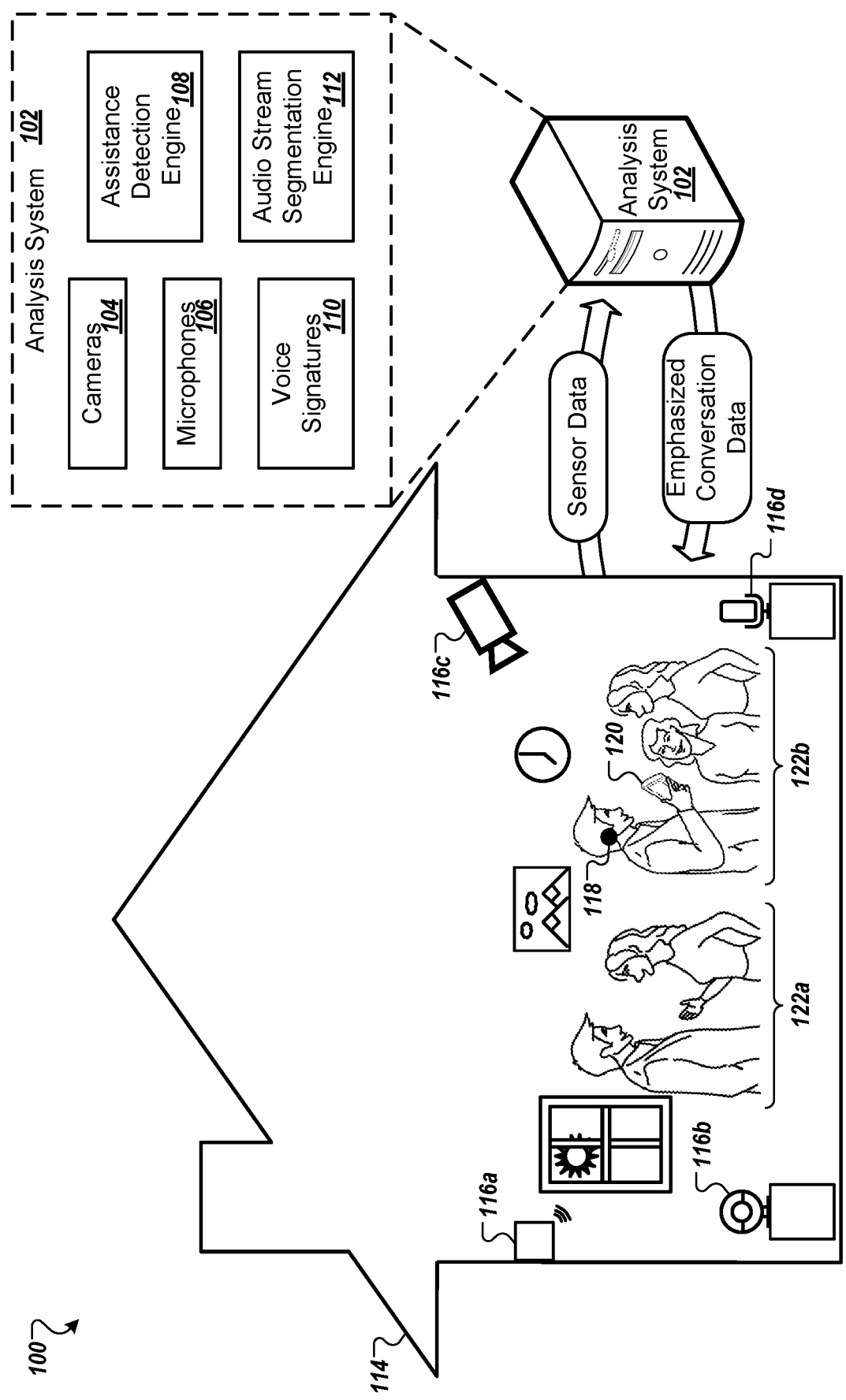
FIG. 1 depicts an example environment in which an analysis system communicates with multiple sensors to detect audio data for a conversation.

FIG. 1 depicts an example environment 100 in which an analysis system 102 communicates with multiple sensors 116a-d to detect audio data, video data, or both, for a conversation. The analysis system 102 can receive data from the sensors 116a-d, including an audio stream that encodes sounds from a room, e.g., a conversation or music or both. The analysis system 102 can analyze the audio stream to determine a portion of the audio stream that encodes data for a conversation in which a person with a hearing aid is participating.

The analysis system 102 can then provide data to a hearing aid 118 worn by the person to emphasize the conversation. This can enable the hearing aid 118 to better present audio data for the conversation to the person, e.g., with reduced or minimized background noise that includes sounds that are not part of the conversation. Although FIG. 1 is described with reference to the hearing aid 118, the analysis system 102 can perform similar analysis for any appropriate type of mobile speaker, e.g., headphones or earbuds that can provide isolated audio to a person's ears.

The analysis system 102 includes multiple sensors, such as cameras 104 and microphones 106. When the analysis system 102 is installed at a physical location, such as a home 114, the sensors included in the analysis system 102 can be the sensors 116a-d that are physically located at the home 114. When the analysis system 102 is at another physical location, such as when the analysis system 102 is part of a cloud computing system, or when the analysis system 102 is part of a mobile device 120, the analysis system 102 might not include the cameras 104 and the microphones 106. In these implementations, the analysis system 102 may only receive data from the sensors 116a-d installed at the home, e.g., as part of another system. In some examples, the analysis system 102 can be part of a mobile device 120 associated with the hearing aid 118.

The analysis system 102 includes an assistance detection engine 108. The assistance detection engine 108 analysis various signals from the home to detect when a hearing aid 118 is physically located at the home 114, e.g., and should be provided data that emphasizes a portion of an audio stream. For instance, the assistance detection engine 108 can determine when the hearing aid 118 is worn by a user. The assistance detection engine 108 can use any appropriate signals from the sensors 116a-d to determine when to provide an emphasized portion of an audio stream to the hearing aid 118.

In some implementations, the assistance detection engine 108 can analyze data from a video stream, e.g., received from one or more cameras 116b-c, to detect a hearing aid 118. The assistance detection engine can use video analytics on at least a portion of the video stream to detect the hearing aid 118 in a person's ear.

In some implementations, the assistance detection engine 108 can use data received from the hearing aid 118, a mobile device 120, e.g., associated with the hearing aid 118, or both. For instance, one of the sensors 116a, such as an infrared receiver or a WiFi router, could receive a signal from the hearing aid 118 or the mobile device 120. The infrared receiver can be an infrared enabled camera or another type of infrared receiver. When the infrared receiver is a camera, the analysis system 102 can analyze infrared data captured by the camera to detect the signal.

The signal can indicate that the analysis system 102 should analyze an audio stream for the hearing aid 118. In some examples, the signal can uniquely identify the hearing aid 118, e.g., include an identifier for the hearing aid 118 or an account associated with the hearing aid 118.

In some implementations, the assistance detection engine 108 can use facial recognition, voice signatures 110, or both, to detect people who are known to wear hearing aids 118, e.g., smart hearing aids that can receive data from the analysis system 102. For instance, the analysis system 102 can include a database of data for persons who register with the system. The registration process can include storing, for the person, a voice signature 110, facial recognition data, or both. The assistance detection engine 108 can then use the voice signature 110 when analyzing an audio stream captured by a microphone 116d. When the assistance detection engine 108 detects speech that matches the voice signature 110, the assistance detection engine 108 can determine that the analysis system 102 should analyze an audio stream to detect a conversation for the hearing aid 118.

The assistance detection engine 108 can use facial recognition data when analyzing part of a video stream from the cameras 116b, 116c, or both. When the assistance detection engine 108 determines that a face depicted in the video stream matches the facial recognition data, the assistance detection engine 108 can determine that the analysis system 102 should analyze an audio stream to detect a conversation for the hearing aid 118.

The analysis system 102 can allow a person who lives in the home 114, a person who does not live in the home 114, or both, to register for hearing aid assistance. For instance, a person who lives in the home 114 can use a web interface to register. The registration process can create a profile that includes facial recognition data, e.g., a photo or a face signature, a voice signature, or both, for a hearing aid user.

In some examples, a hearing aid 118, or a mobile device 120, for a person who does not live in the home can include registration data on the device. The registration data can include a voice signature, facial recognition data, or both. When the hearing aid 118 or the mobile device 120 enter the home 114, the hearing aid 118 or the mobile device 120 can detect that the home 114 is associated with the analysis system 102 that provides hearing aid assistance. In response, the hearing aid 118 or the mobile device 120 can register with the analysis system 102, e.g., automatically without user input or based on user input, using the registration data. The registration data can be anonymized, as discussed below, for enhanced security in these situations.

The assistance detection engine 108 can detect a device "check-in" when the device physically enters a home 114 or a room in the home, e.g., that is smart hearing aid enabled. For example, the assistance detection engine 108 can detect, encoded in an audio stream for the home 114 or the room, sound for a check-in key word or key phrase. The assistance detection engine 108 can determine that the key word or key phrase was spoken by a person who was standing in clear view of a camera. The assistance detection engine 108 can determine to analyze the audio stream for a hearing aid 118 for the person, e.g., to emphasize audio for conversations in which the person participates.

In some implementations, the assistance detection engine 108 can determine identification data that uniquely identifies a person wearing the hearing aid 118. The analysis system 102 can use the identification data to estimate a physical location of the person in the home 114, in a room, or both. For instance, the analysis system 102 can use the identification data to determine that the person is in the left corner of the room and speaking with other people nearby.

The identification data can include heartbeat data, supersonic or sub-sonic signals from speakers in a room in which the person is physically located or from the hearing aid 118, audio data from the hearing aid 118, or a combination of two or more of these. The analysis system 102 can synchronize the heartbeat data with transdermal optical imagery captured by the camera(s) 116b-c in the room in order to match a unique heartbeat signature. The analysis system can use the super or sub-sonic signals to estimate the person's physical position. The analysis system 102 can correlate the super or sub-sonic signals with physical target positions captured from the calibrated video to estimate the person's physical position. The analysis system 102 can detect small differences between the audio feeds from the hearing aid 118 and the microphones 116*d* to determine the position of the hearing aid 118 relative to the position of the microphone 116*d*. In some examples, the microphone 116*d* can be part of a smart speaker. If the physical location of the smart speakers is known, the analysis system 102 can use this smart speaker location data to estimate the location of the hearing aid 118.

In some implementations, the analysis system 102 can determine an estimated location of the hearing aid 118 or a person wearing the hearing aid 118 or both using a wireless signal at a check-in time. The analysis system 102 can use data for a wireless signal that connects the hearing aid 118 or another device for the hearing aid 118, e.g., a smartphone that performs the check-in process. The analysis system 102 can determine, from the data for the wireless signal, an estimated physical location for the corresponding device. For instance, the analysis system can locate the device using an ultra-wideband signal ("UWB"), a Bluetooth ("BT") signal, or another appropriate type of signal. The analysis system 102 can then correlate the estimated physical location with image data from the cameras 104 to determine a person depicted in a video stream at a location that corresponds to the estimated physical location. The analysis system can then determine that the person depicted in the video stream is likely wearing the hearing aid 118.

The analysis system 102, e.g., the assistance detection engine 108, can analyze a video stream received from the home, e.g., as part of the sensor data, to detect conversation groups 122*a-b*. In this document, a conversation group refers to a group of multiple people who are currently talking to one another. The people in the group may be facing each other, some of the people may be looking in the same direction, e.g., at a picture, or a combination of both.

The assistance detection engine 108 can determine that one or more people are in a conversation group using video analytics to recognize which people are participating in a conversation and with whom. The assistance detection engine 108 can use visual clues as part of the video analytics. For example, the assistance detection engine 108 can recognize that two people are facing each other and create a first conversation group 122*a* for the two people.

The assistance detection engine 108 can create identifiers, e.g., anonymous identifiers, for the analysis system 102 to use while providing assistance to a person wearing a hearing aid 118. The identifiers can enable the analysis system 102 to create temporary profiles for each person in the conversation group, e.g., that identify potential voice signatures 110 for the people in the group. The analysis system 102 can use the temporary profiles to enhance or minimize speech spoken by the corresponding person when emphasizing a conversation for a hearing aid 118.

For instance, the assistance detection engine 108 can detect two conversation groups, a first conversation group 122*a* and a second conversation group 122*b* the latter of which includes a person wearing a hearing aid. The assistance detection engine 108 can create a first temporary profile for a first person in the first conversation group 122*a* and a second temporary profile for a second person in the second conversation group 122*b*.

When the analysis system 102 receives an audio stream that includes speech from both the first person and the second person, the analysis system 102 can use the first temporary profile to minimize the first person's speech, the second temporary profile to emphasize the second person's speech, or both. The analysis system 102 can minimize the first person's speech by reducing a decibel level of the speech or substantially removing the speech from the audio stream. The analysis system 102 can emphasize the second person's speech by increasing a decibel level of the speech, by generating text for the speech, e.g., for presentation on the mobile device 120, or by minimizing other sounds encoded in the audio stream. The other sounds can include music, the first person's speech, or other sounds that are not part of the second conversation group 122*b*.

The analysis system 102 can determine the conversation groups 122*a-b* using body language cues, gaze tracking, lip reading, or a combination of two or more of these. For instance, the analysis system 102 can determine that two people are in a conversation group when the analysis system 102 detects eye contact between the two people, physical mirroring behavior, or both. The analysis system 102 can use gaze tracking to determine conversation groups by detecting who a person is looking at when they speak, which people are looking at the same object and are part of a conversation group, or both. In some examples, when the analysis system 102 uses lip-reading or lip-motion-detection, the analysis system can detect conversation rhythms, e.g., people taking turns speaking, and determine that the people with the same conversation rhythm are in a conversation group.

In some examples, the analysis system 102 can use camera images to detect the conversation groups. For instance, the analysis system 102 can determine an estimated physical location for multiple people in the home 114 and use the estimated physical locations to determine conversation groups 122*a-b*. When the analysis system 102 determines that two people are within a threshold distance from each other, the analysis system 102 can determine that there is a likelihood that the two people are in a conversation group.

The analysis system 102 can use a combination of two or more of these processes to determine the conversation groups. For instance, the analysis system 102 can use both video analytics and lip-motion-detection to determine the conversation groups 122*a-b*.

When the analysis system 102 detects a hearing aid for which the analysis system 102 is providing assistance, the analysis system 102 may detect conversation groups on an ongoing basis. This detection can be continuous or substantially continuous, e.g., once for each predetermined time period. This detection can account for a conversation group 122*b* that includes people A, B, and C when person C later starts talking to person D who was not in the conversation group. The analysis system 102 may need to recognize the change in conversation groups right away when person C is wearing a hearing aid 118 to enable the analysis system 102 to redirect audio data to the hearing aid 118 appropriately.

An audio stream segmentation engine 112 included in the analysis system 102 can isolate can detect sounds generated by different sources. For instance, the audio stream segmentation engine 112 can receive one or more audio streams from the sensors 116*a-d*. A first audio stream can be captured by a camera 116*b* and a second audio stream can be captured by a microphone 116*d*, e.g., included in a smart speaker. In some examples, a single device can include multiple microphones. For instance, a smart speaker can include an array of microphones. In some examples, the audio stream segmentation engine 112 can optionally receive an audio stream from the hearing aid 118. In some examples, the audio stream segmentation engine 112 does not receive an audio stream from the hearing aid 118.

The audio stream segmentation engine 112 can determine, using the audio stream, per-person audio streams, e.g., one for each person in a room. Sometimes, when a person is not talking the personal audio stream for that person can be empty. The audio stream segmentation engine 112 can use information about different speakers to generate the per-person audio streams. For instance, when the audio stream segmentation engine 112 receives estimated location information for a person from the assistance detection engine 108, the audio stream segmentation engine 112 can use information about the locations of the microphones that captured audio streams to determine a portion of the audio stream that is specific to the person. The audio stream segmentation engine 112 can combine data from the multiple audio streams received from different microphones to make a personal audio stream for the person.

The audio stream segmentation engine 112 can associate a personal audio stream with a person most likely to have spoken the words encoded in the audio stream. The audio stream segmentation engine 112 can associate a personal audio stream with a person by labelling an audio stream with an identifier for a person.

To associate a personal stream with a person, the audio stream segmentation engine 112 can combine timing of audio data with timing of lip movement, mouth movement, or both. The audio stream segmentation engine 112 can recognize and associate some lip movement with specific sounds.

The audio stream segmentation engine 112 can calculate approximate physical positioning using audio triangulation. The audio stream segmentation engine 112 can combine audio triangulation with more precise physical location tracking from location-calibrated cameras. In some examples, the audio stream segmentation engine 112 can use a machine learning engine to calculate the approximate physical positioning using audio triangulation. When the audio stream segmentation engine 112 uses location data from multiple sources, the audio stream segmentation engine 112 can train the machine learning engine based on the data from multiple sources to improve its audio triangulation capabilities over time.

In some implementations, the audio stream segmentation engine 112 can use a decibel level of a sound to determine a person who likely spoke the sound. For instance, the audio stream segmentation engine 112 can compare audio streams captured at the same time from multiple microphones at various locations in the room and recognize that some voices are louder in some locations than others.

A personal audio stream does not necessarily encode audio data only for a particular person's spoken words. Instead, a personal audio stream can includes data that encodes a clear version of the respective person's voice, e.g., louder than other background noise.

In some implementations, the audio stream segmentation engine 112 can use other data for the home 114 when generating personal audio streams. For instance, the audio stream segmentation engine 112 can use data that indicates music played by a speaker to subtract that music from the received audio stream(s). In some examples, the audio stream segmentation engine 112 can receive, e.g., from a smart speaker, audio streams that already have background music played by the speaker subtracted from the audio stream.

The audio stream segmentation engine 112 can use lip movement data, mouth shape data, or both, to generate a personal audio stream for a person. For instance, the audio stream segmentation engine 112 can use lip movement data to identify when each person is speaking and sounds that coincide with one person's lip movement. The audio stream segmentation engine 112 can determine that sounds that coincide with a person's lip are more likely to be part of that person's audio stream. The audio stream segmentation engine 112 can use mouth shapes, lip shapes, or both, to recognize when a person is making certain sounds. The audio stream segmentation engine 112 can match a series of mouth shapes, lip shapes, or both, to a corresponding series of sounds. The audio stream segmentation engine 112 can then isolate those sounds that correspond to the mouth shapes, lip shapes or both, and consider that set of sounds to be from that one person.

The audio stream segmentation engine 112 can determine personal audio streams, e.g., for each person in the home 114, continuously. For instance, the audio stream segmentation engine 112 can determine a personal audio stream for a person in the first conversation group 122a even though a hearing aid 118 user isn't in the first conversation group 122a so that the analysis system 102 can readily provide emphasized audio data for the first conversation group 122a if the hearing aid 118 user moves from the second conversation group 122b to the first conversation group 122a.

In some implementations, the analysis system 102 can use video analytics to determine people for whom the analysis system 102 should determine personal audio streams. In these implementations, the analysis system 102 might not determine a personal audio stream for each person in the home 114. For example, the analysis system 102 can identify those people in an area wearing hearing aids. The analysis system 102 can use location data for the people wearing hearing aids to determine people within a threshold distance from at least one of the people wearing a hearing aid. The analysis system 102 can process audio signals to determine personalized audio streams for the people who are within a threshold distance from at least one of the people wearing a hearing aid.

The analysis system 102 can process audio signals from speakers that are located within the threshold distance from at least one of the people wearing a hearing aid. The analysis system 102 can process video signals from cameras that are located within the threshold distance from at least one of the people wearing a hearing aid. The analysis system 102 can process video images, or portions of video images, that depict content that is located within the threshold distance from at least one of the people wearing a hearing aid.

The audio stream segmentation engine 112 can update the voice signatures 110 based on its analysis. For example, by examining audio from time-segments when each person is speaking without any overlap, the audio stream segmentation engine 112 can identify unique signatures for each person and store these voice signatures in a temporary profile for the person. In some implementations, the audio stream segmentation engine 112 can use the voice signatures 110 to recognize and isolate when that person is speaking, even when there are overlapping conversations at the same time.

The analysis system 102 can delete the temporary profiles at predetermined times. For instance, the analysis system 102 can delete all temporary profiles stored in the analysis system 102 when the analysis system 102 determines that the hearing aid 118, and the person wearing the hearing aid 118, left the home 114. The analysis system 102 can make this determination based on video streams from the cameras 116b-c or other appropriate sensor data, e.g., data representing user input that indicates that the analysis system 102 should stop analyzing sensor data.

In some implementations, the analysis system 102 can store some signature data in a more long-term memory, e.g., upon receipt of appropriate approval from a corresponding person. This can enable the analysis system 102 to more accurately recognize that person using their voice signature, their face signature, or both, in the future. For example, the analysis system 102 can have profile data for Fred that includes data for his face. The analysis system 102 can provide certain features to Fred based on face recognition, e.g., access to certain home security features. When the analysis system 102 determines a voice signature for Fred, and associates the voice signature with Fred's profile, e.g., based on analysis for providing an audio stream to the hearing aid 118, the analysis system 102, or another appropriate system, can use Fred's voice signature to authenticate Fred for access to the certain features, e.g., in situations where his face may be obscured or hard to see.

In some implementations, the analysis system 102 can receive data from the hearing aid 118 and use some of the received data when emphasizing a portion of an audio stream. For instance, the analysis system 102 can use data from a microphone embedded in the hearing aid 118 to identify and separate sounds and voices that are closer to the hearing aid 118 than other sounds and voices. The analysis system 102 can use data from a microphone embedded in the hearing aid 118 to identify speech coming from the person wearing the hearing aid 118. The analysis system 102 can use this data of speech by the person wearing the hearing aid 118 to subtract or de-emphasize that speech in the audio stream that the analysis system 102 sends to the hearing aid 118. In some examples, when the analysis system 102 processes data for multiple hearing aids for two people who are in the same conversation group, the analysis system 102 can use data of speech by the person wearing the hearing aid 118 to emphasize that speech in the audio stream that the analysis system 102 sends to a hearing aid for another person in the same conversation group.

In some implementations, when the hearing aid 118 does not receive emphasized conversation data from the analysis system 102, e.g., it temporarily loses connectivity, the hearing aid 118 can operate in a normal mode. For example, the hearing aid 118 can generate an audio stream for the person wearing the hearing aid 118 as it would when the hearing aid 118 otherwise does not have a connection with the analysis system 102. This may occur or if the wearer wanders outside of the range of the analysis system 102, e.g., wanders outside where there is no network connection.

In some implementations, the analysis system 102 can use data from the hearing aid to adjust sound levels in the home 114. For instance, when the analysis system 102 analyzes audio data received from the hearing aid 118 and determines that the hearing aid is near a speaker, the analysis system 102 can analyze the audio data to determine a decibel level. When the analysis system 102 determines that music from the speaker is greater than a threshold volume, the analysis system 102 can send a signal to the speaker, or an amplifier that powers the speaker, to decrease the volume of the music.

In some implementations, the analysis system 102 can selectively cancel out sounds, e.g., music, generated by the speaker. For instance, the analysis system 102 can cancel out the sounds generated by the speaker using data that indicates a physical location of the speaker, data that indicates an audio signal generated by the speaker, data that indicates delay characteristics of sounds generated by the speaker, e.g., given measurements from a microphone in the hearing aid 118, or other appropriate data.

In some implementations, the analysis system 102 can optimize the decibel levels of one or more sounds encoded in the audio stream. For instance, when the analysis system 102 emphasizes sound for the second conversation group 122b, the analysis system 102 can reduce sound for the first conversation group 122a to a first, lowest decibel level, and reduce sound for music playing in the background to a second, intermediate decibel level. The analysis system 102, or the hearing aid 118, can have settings data that indicates various volume levels or volume ratios for the analysis system 102 to use when optimizing the decibel levels of sound encoded in the audio stream.

In some implementations, the analysis system 102 can optimize a perceived audio source for sounds encoded in the audio stream. For instance, with sufficient location data, the analysis system 102 can alter an incoming audio stream as received from the smart speaker or another source so that it sounds, to the listener, like it is coming from the appropriate direction and distance. The analysis system 102 can make this alteration based on where the listener and the person speaking are located relative to one another.

In some implementations, the analysis system 102 can emphasize words spoken by a person who is not part of the conversation group in which the person wearing the hearing aid 118 participates. For example, another person might try to get the person's attention from across the room, or a person in the room might try to make an announcement to everyone in the room, e.g., to make a toast or safety announcement. The analysis system 102 can detect that the other person is speaking words for the person and emphasize the other person's words, e.g., by combining the other person's words with words for the conversation group in which the person is participating.

The analysis system 102 can determine that another person is trying to get the person's attention based on words the other person speaks, movement by the other person, or a combination of both. The words can be key words or key phrases that the analysis system 102 recognizes as flagging words for someone who is in a different conversation group. The words might be the name of the person wearing the hearing aid 118. The analysis system 102 can determine that the other person is trying to get the person's attention based on the other person's posture, gestures, or both. The movement can be consistent with getting someone's attention, e.g., based on training of the analysis system 102.

The analysis system 102 can determine that there is likely a room announcement based on any appropriate signal. For instance, the analysis system 102 can use one or more of video analytics to detect when everyone in the room reorients towards one person or location, audio analysis to recognize when everyone in the room goes silent at the same time, e.g., except for the person wearing the hearing aid 118, or voice recognition to parse all detected voices and monitor for specific keywords.

In some example, people A, B, C, D and E are in a room in the home 114 that has four smart speakers and a camera 116c that has a clear view of all five people. Person C is wearing a hearing aid 118. Person A and B, in a first conversation group 122a, are having a conversation about trains. Persons C, D and E, in a second conversation group, are having a separate conversation about politics.

The analysis system 102 can receive data that indicates that person C "checked in" with the analysis system 102 on arrival at the home 114. The analysis system 102 can detect person C's hearing aid and track person C using video analytics so that the analysis system 102 can emphasize a conversation for the person C.

The analysis system 102 can detect, from the video data, five separate people. The analysis system 102 can detect that persons A and B are looking at each other and speaking, determine that they are likely having a conversation, and associate persons A and B with the first conversation group 122a. The analysis system 102 can use words spoken by the persons A and B to determine that they are likely having a conversation. For instance, when both person A and person B mention the word trains, the analysis system 102 can determine that the person A and the person B are likely having a conversation.

The analysis system 102 can determine that persons C, D and E are facing one another, and are taking turns speaking and there is at least a threshold likelihood that persons C, D, and E are in another conversation. As a result, the analysis system 102 can associated persons C, D, and E with the second conversation group 122b. Using video data, the analysis system 102 can also determine where in the room each of the five people are physically located.

The analysis system 102 can analyze lip movement from video data and detect voice signatures in audio data to separate out audio streams for each of the five individuals. The analysis system 102 can use lip movement timing, analysis of each independent audio stream, e.g., each personal audio stream, and physical location data for each person based on video analysis, and location data associated with each audio stream, to associate each audio stream with one of the five people.

Since the analysis system 102 has a personal audio stream for each of the five people, and associated each person with a conversation group, the analysis system 102 can determine an audio stream for the second conversation group 122b to which the person C is associated. When there are more than two people in a conversation group, the analysis system 102 can determine which of the other, non-hearing aid persons is speaking and send the personal audio stream for the speaker to the hearing aid 118. For instance, the analysis system 102 can determine that the personal audio stream for the person D is empty, e.g., the person D is not likely talking, and that the personal audio stream for the person E includes audio data, e.g., the person E is likely talking. The analysis system 102 can send data for the personal audio stream of the person E to the hearing aid 118 of the person C.

When the analysis system 102 detects movement of the person C with the hearing aid 118 from the second conversation group, e.g., when person C moves and starts to talk about trains instead of politics, the analysis system 102 can associate the person C with the first conversation group 122a and remove the association of the person C with the second conversation group 122b. Based on this detection, the analysis system 102 stops sending emphasized data for the second conversation group 122b to the hearing aid and begins to send emphasized data for the first conversation group 122a to the hearing aid 118.

The analysis system 102 is an example of a system implemented as computer programs on one or more computers in one or more locations, in which the systems, components, and techniques described in this document are implemented. The mobile device 120 may include mobile communication devices, and other devices that can send and receive data over a network. The network (not shown), such as a local area network (LAN), wide area network (WAN), the Internet, or a combination thereof, connects the analysis system 102, the sensors 116a-d, the hearing aid 118, and the mobile device 120. The analysis system 102 may use a single server computer or multiple server computers operating in conjunction with one another, including, for example, a set of remote computers deployed as a cloud computing service.

The analysis system 102 can include several different functional components, including the assistance detection engine 108, and the audio stream segmentation engine 112. The various functional components of the analysis system 102 may be installed on one or more computers as separate functional components or as different modules of a same functional component. For example, the assistance detection engine 108, and the audio stream segmentation engine 112 of the analysis system 102 can be implemented as computer programs installed on one or more computers in one or more locations that are coupled to each through a network. In cloud-based systems for example, these components can be implemented by individual computing nodes of a distributed computing system.

Figure 2A:
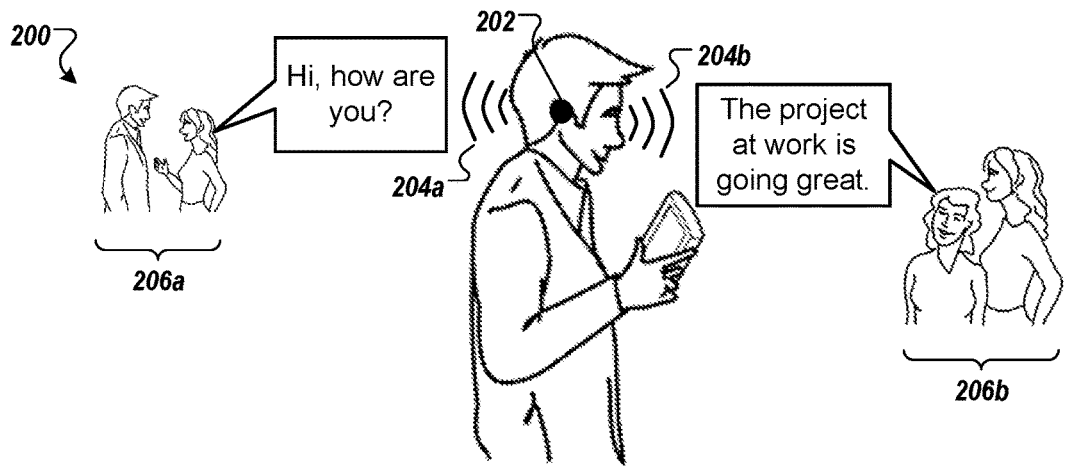
FIGS. 2A-C depict an example environment in which an analysis system emphasizes speech for a hearing aid.
Figure 2B:
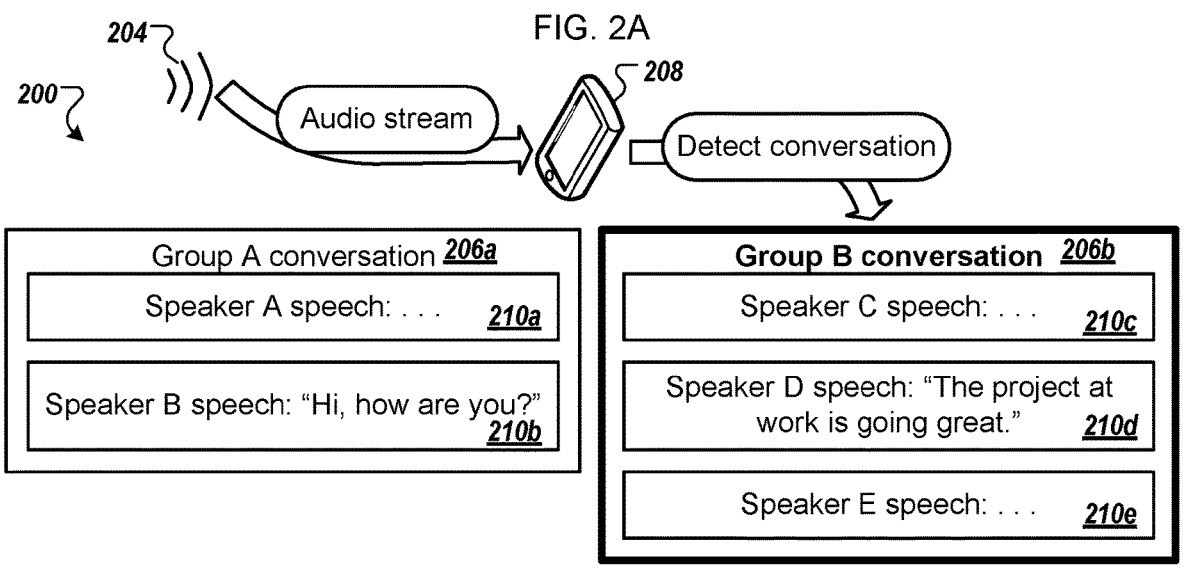
Figure 2C:
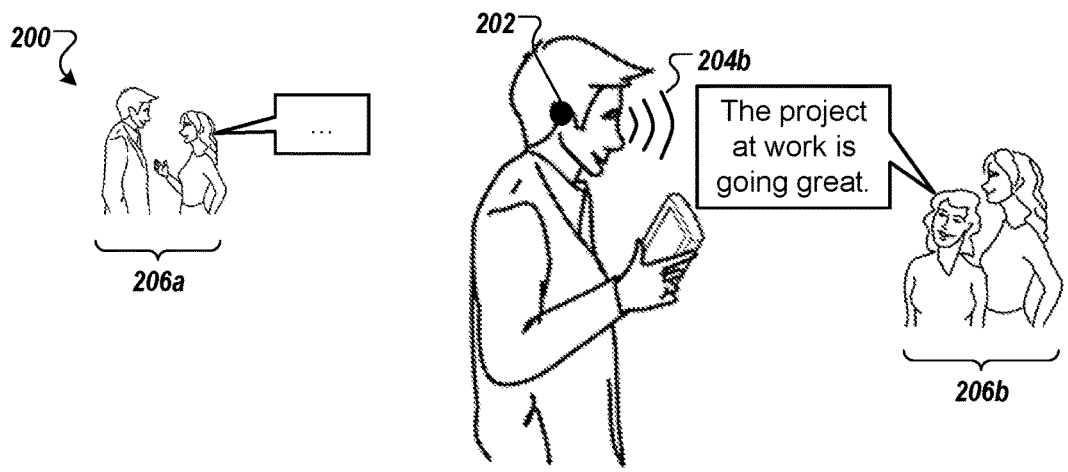

FIGS. 2A-C depict an example environment 200 in which an analysis system emphasizes speech for a hearing aid 202. In FIG. 2A, the hearing aid 202 receives sounds waves 204a-b from multiple sources. The multiple sources can include two conversation groups 206a-b, music from a speaker, or other sound. Because the hearing aid 202 receives the sound waves 204a-b from multiple sources, the hearing aid 202 amplifies the sound from each of the multiple sources, e.g., making it difficult for a person wearing the hearing aid 202 to distinguish sounds from a particular source FIG. 2B depicts an analysis system, e.g., on a mobile device 208, selecting data from one of the sources for emphasis. For instance, the mobile device 208 receives an audio stream that represents the sound waves 204 from a microphone. The microphone can be included in the mobile device 208, the hearing aid 202, another device, or a combination of two or more of these.

The mobile device 208 identifies, in the received audio stream, individualized audio streams for each of the sources. For instance, the mobile device 208 determines a personalized audio stream for each person and an individualized audio stream of music playing on a speaker.

The mobile device 208 determines conversation groups, e.g., using video analytics as discussed above or another appropriate process or combination of processes. The mobile device 208 determines, for each of the conversation groups 206a-b, the individualized audio streams 210a-e for the conversation group. For example, the mobile device determines that two individualized audio streams 210a-b are for a conversation group A 206a and that three individualized audio streams 210c-e are for a conversation group B 206b.

The mobile device 208 determines that the hearing aid 202 is associated with the conversation group B 206b, e.g., that the person wearing the hearing aid 202 is in the conversation group B 206b. In response, the mobile device 208 emphasizes an individualized audio stream 210c-e for the conversation group B 206b. For example, the mobile device 208 can determine that a third individualized audio stream 210c, for the hearing aid wearer, and a fifth individualized audio stream 210e both currently do not encode spoken words and that a fourth individualized audio stream 210d currently encodes spoken words. The mobile device 208 can emphasize the fourth individualized audio stream 210d.

In FIG. 2C, the hearing aid 202 is presenting emphasized content for an audio stream to the wearer. For example, the hearing aid 202 is presenting the fourth individualized audio stream 210d that encodes "The project at work is going great" to the person wearing the hearing aid 202.

Figure 3:
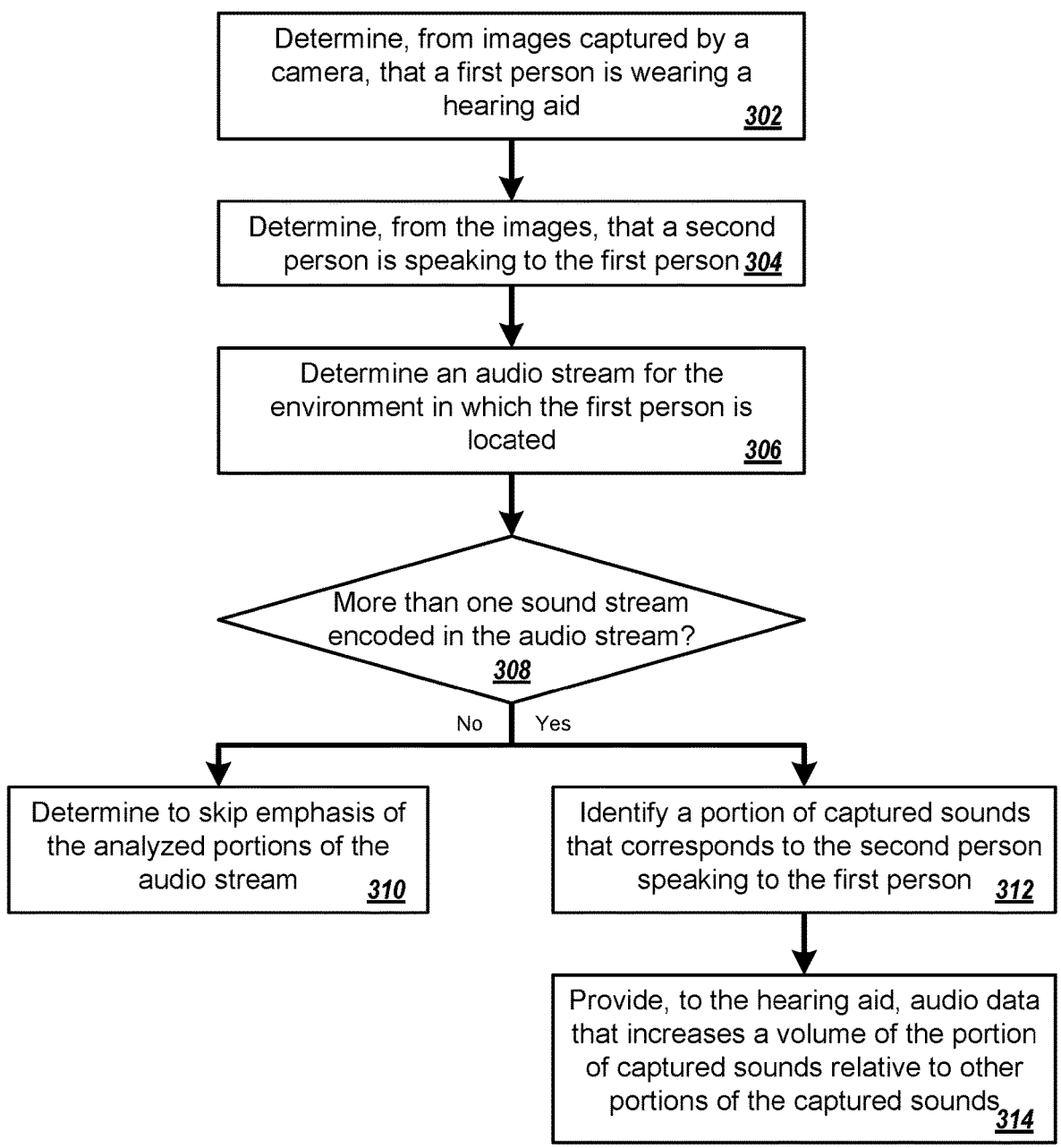
FIG. 3 is a flow diagram of a process for emphasizing a portion of audio data.

FIG. 3 is a flow diagram of a process 300 for emphasizing a portion of audio data. For example, the process 300 can be used by the analysis system 102 from the environment 100.

A system determines, that a first person is wearing a hearing aid (302). For instance, the system receives images from the camera. The system can detect a person depicted in at least one of the images who is wearing a mobile speaker, e.g., a hearing aid or headphones. In some implementations, determining that a first person is wearing a hearing aid includes detecting, based on image recognition performed on the images captured by the camera, an appearance of the hearing aid in the images. For example, the analysis system 102 may visually recognize a hearing aid in an image, and then determine a person that is wearing the hearing aid that was recognized.

In some implementations, determining that a first person is wearing a hearing aid includes detecting a presence of the hearing aid through network discovery and determining that the first person is wearing the hearing aid based on one or more of audio captured by the hearing aid or the images. For example, the analysis system 102 may detect signals being transmitted by the hearing aid and from those signals determine that the hearing aid is present. In the example, the analysis system 102 may attempt to determine which person is wearing the hearing aid. For example, the analysis system 102 may deduce which person in a scene is the person wearing the hearing aid from imagery and/or the audio signals from the hearing aid.

The system determines, from the images, that a second person is speaking to the first person (304). For example, the system uses video analytics to determine that the second person is speaking to the first person. In some implementations, determining, from images captured by a camera, that a second person is speaking to the first person includes determining, from the images, that the first person and the second person are within a threshold distance from each other and are facing each other. For example, the analysis system 102 may determine that the first person and the second person are within six feet of each other and are each facing in a direction that is less than thirty degrees from a direction that the other person is located from them.

In some examples, the system can analyze data for a video stream, e.g., that includes multiple images, to determine that one or more other people are in a conversation with the person. The system can form a conversation group that associates the one or more other people with the person.

The system determines an audio stream for the environment in which the first person is located (306). The system can receive the audio stream from a microphone. The system can receive multiple audio streams for the environment, each from a separate microphone. In some implementations, determining an audio stream for the environment in which the first person is located includes identifying a microphone in the environment in which the first person is located and obtaining the audio stream from the microphone that was identified. For example, the analysis system 102 may determine a particular microphone is closest to the first person and, in response, obtain the audio stream from the particular microphone.

The system can create, from the one or more audio streams, a personal audio stream for a person detected in the area that includes the first person. The area can include a room, a house, or an open space, e.g., a garden that includes the camera and the microphone. The personal audio stream can encode the words spoken by the person associated with the personal audio stream.

In some examples, the system can detect, using one or more audio streams and data for the conversation group, a likely isolated audio conversation encoded in at least one of the audio streams and for the conversation group.

The system determines whether more than one sound stream is encoded in the audio stream (308). For instance, the system can determine whether the audio stream encodes multiple conversations, e.g., multiple sound streams, a conversation and background noise, e.g., two sound streams one for each of the conversation and the background noise, or otherwise includes audio data from multiple sources not part of a single conversation.

In some implementations, determining whether more than one sound stream is encoded in the audio stream includes determining whether the audio stream includes a first sound stream that corresponds to the second person speaking to the first person and a second sound stream that corresponds to a third person speaking to a fourth person. For example, the analysis system 102 may determine from the images and the audio stream that the second person was speaking to the first person while another person in another conversation group was speaking.

In some implementations, determining whether the audio stream includes a first sound stream that corresponds to the second person speaking to the first person and a second sound stream that corresponds to a third person speaking to a fourth person includes determining, from the images, that the third person is speaking to the fourth person in the environment. For example, the analysis system 102, may determine from the images that a third person is within six feet of the microphone closest to the first person and the third person's lips are moving.

In some implementations, determining whether more than one sound stream is encoded in the audio stream includes determining, from the audio stream, that speech is being spoken with a voice that does not belong to the first person and does not belong to the second person. For example, the analysis system 102 may learn the voice of the first person and the voice of the second person, and classify that speech in the audio stream is in neither the voice of the first person nor the second person.

In response to determining that more than one sound stream is not encoded in the audio data, the system determines to skip emphasis of the analyzed portions of the audio stream (310). For instance, the system can determine that it does not need to emphasize any portion of the audio stream when the audio stream only encodes a sound stream for a single group of people talking to each other without any other conversations or background noise. The determination can be based on detection of background noise or another conversation whose volume level satisfies a threshold volume level, e.g., is less than a threshold volume. When an environment includes audio only for people in a single conversation group, the system can determine to allow the hearing aid to adjust the volume level because the system did not detect background noise that would interfere with the spoken words for the conversation group.

In some implementations, based on determining that more than one sound stream is encoded in the audio data, identifying a portion of captured sounds that corresponds to the second person speaking to the first person includes identifying a portion of speech in the captured sounds that matches a voice of the second person. For example, the analysis system 102 may learn the voice of the second person, and then identify a portion of speech in the captured sound matches the voice of the second person.

In some implementations, the system can continue to analyze the audio stream to determine whether multiple sound streams are encoded in future portions of the audio stream. For example, if a person in the group begins another conversation group, e.g., with someone who just walking into the room or on a telephone, the system would determine that more than one sound stream is encoded in the audio stream. In this example, the system would then proceed to step 312 for that future portion of the audio stream.

In some implementations, when the system determines that the audio stream encodes only a single sound stream, the system can determine to emphasize an analyzed portion of the audio stream. For instance, in implementations in which the system provides transcription, live closed-captioning, or translation functionality, the system can continue to step 312 without performing step 310. In these implementations, the system might not perform step 308.

In some implementations, the system can dynamically adjust a volume level of audio provided to a hearing aid. In this implementations, the system can continue to step 312 without performing steps 308 and 310. For instance, the system can determine a volume level of the audio stream received by the hearing aid. The system can determine whether the volume satisfies a threshold volume. When the volume does not satisfy a threshold volume, the system can provide the hearing aid with an emphasized audio stream, whether or not the audio stream encodes only a single sound stream, provide the hearing aid with instructions to dynamically adjust the volume level, or both.

In some implementations, the system can provide an audio stream to the hearing aid when the system does not receive any audio stream data, volume level data, or both, from the hearing aid. The system can provide the audio stream to the hearing aid that has a volume level higher than a volume level at which the hearing aid would present audio content encoded in the audio stream to a user. For instance, when the system determines that only one sound stream is encoded in the audio stream, and that the one sound stream is music, e.g., from a speaker in an environment in which the hearing aid is located, the system can provide audio data to the hearing aid to enable the hearing aid to present louder, clearer, or both, music than the hearing aid would otherwise be able to present, e.g., based on a physical distance between the hearing aid and the speaker.

In response to determining that more than one sound stream is encoded in the audio data, the system identifies a portion of captured sounds that corresponds to the second person speaking to the first person (312). For instance, the system selects a personalized audio stream for a second person in the same conversation group as the first person.

The system provides, to the hearing aid, audio data that increases a volume of the portion of captured sounds relative to other portions of the captured sounds (314). The system can otherwise emphasize the second person's voice.

In some examples, the system can provide, to a device associated with the mobile speaker, data to cause the device to enhance the predicted isolated audio conversation for the conversation group. The data can include a portion of the audio stream that emphasizes the second person's voice, de-emphasizes sounds other than the second person's voice, or both. The data can increase a decibel level, decrease or mute other sounds, or both.

In some implementations, providing, to the hearing aid, audio data that increases a volume of the portion of captured sounds relative to other portions of the captured sounds includes at least one of reducing a volume of the captured sounds that do not correspond to the second person speaking to the first person or increasing the volume of the portion of the captured sounds that correspond to the second person speaking to the first person. For example, the analysis system 102 may one or more of reduce a volume of speech of a third person to a fourth person or increase a volume of speech of the second person speaking to the first person.

The order of steps in the process 300 described above is illustrative only, and providing the audio data that increase a volume of the portion of captured sounds relative to other portions of captured sounds can be performed in different orders. For example, the system can determine the audio stream (e.g., perform step 306) prior to determining that the first person is wearing a hearing aid (e.g., performing step 302).

In some implementations, the process 300 includes based on determining that more than one sound stream is not encoded in subsequent audio data, skipping emphasis of any portion of the audio stream. For example, the analysis system 102 may determine that no other person than the second person is speaking in the subsequent audio data and, in response, provide the subsequent audio data to the hearing aid without changing a volume of any portion of the subsequent audio data relative to any other portion of the subsequent audio data.

In some implementations, the process 300 can include additional steps, fewer steps, or some of the steps can be divided into multiple steps. For example, the system can perform steps 304, 306, and 314 without performing the other steps in the process 300. In this example, the system can perform other steps, e.g., receipt of data from a check-in process that identifies the hearing aid. In some implementations, the system can perform the process 300 without performing steps 308 and 310, e.g., the system can perform steps 302, 304, 306, 312, and 314.

In some implementations, an analysis system can analyze data for augmented reality applications, virtual reality applications, or both. For instance, when multiple people are in an augmented reality environment, are physically near each other, but only some of whom are virtually near each other, the analysis system can emphasize sounds for the person based on the people who are virtually near the person. The person can be a hearing aid wearer.

For example, in an augmented reality ("AR") or virtual reality ("VR") environment, each person in a group may be wearing headphones for a more immersive experience. The analysis system can use data from the augmented or virtual reality environment, e.g., data for video streams of the environment or environments in which the people are located, to predict who is speaking to who, who is virtually closer to who, or both. The analysis system can use this predicted data to direct specific audio streams to particular headphones.

In some examples, the people in the AR or VR environment might not be physically located near each other, or some of the other people. Some of the people might only be virtually together. The analysis system can track where the people are in the respective three-dimensional space and shape a soundscape around the locations of the people in the three-dimensional space. The analysis system can use this data to emphasize an audio stream for a person or for each person in a group of people. This can enable the analysis system to block out some sounds, e.g., real world noise, while emphasizing other sounds predicted to be more likely specific to the person to whom the sound is emphasized, e.g., emphasizing some of the sounds from the virtual world.

In some implementations, the analysis system can emphasize a portion of an audio stream using live closed-captioning, transcriptions, translations, or a combination of two or more of these. For example, the analysis system can determine a portion of an audio stream to emphasize for a hearing aid, use a speech-to-text process to transcribe the words encoded in the portion of the audio stream, and provide the transcription to a device associated with the hearing aid, e.g., a mobile device such as a smart phone or smart glasses, to emphasize the portion of the audio stream. The analysis system may provide the transcription instead of or in addition to providing emphasized audio to the hearing aid.

When creating individualized audio streams, the analysis system may enable more accurate real-time translation. For instance, a real-time translation system can be more accurate because it would receive an individualized audio stream for a person who is speaking with reduced or eliminated background noise.

The real-time translation system can also use data for a person who spoke the words encoded in the audio stream to determine a translation process. For instance, the real-time translation system can receive, from the analysis system, profile data for the speaker that indicates the language in which words encoded in the portion of the audio stream were spoken. The real-time translation system can receive, from the analysis system, profile data for a listener that indicates the language into which words encoded in the portion of the audio stream should be translated. This can eliminate the need for the real-time translation system to predict the spoken language, increase accuracy of the real-time translation system, or both.

In some examples, given a group of five people, A, B, C, D, and E, as described above, person C is speaking in English; person D is a native French speaker, and person E is a native Spanish speaker. The analysis system can receive check-in data from devices associated with each of these persons: for instance, persons C, D and E all checked in with the analysis system on arrival, and identified their preferred languages.

The analysis system can determine individualized audio streams for persons C, D and E, and that they are all in the same conversation group. The analysis system can provide, to the real-time translation system, individualized audio streams for each of the people and data that identifies the corresponding language for the audio stream. The real-time translation system can use this data to translate everything person C says into French and route that translated audio stream to person D; translate everything person C says into Spanish and route that translated stream to person E; translate everything person D says into English and route that translated stream to person C; etc.

In some examples, when person E is wearing smart glasses, and the real-time translation system can transcribe the words spoken by persons C and D into Spanish. The real-time transcription system can provide the transcription to smart glasses for the person E, causing the smart glasses to present the transcription, e.g., in addition to the translated audio or alone.

In some implementations, the analysis system can be used with video conferencing applications. For instance, when one group of people is together in a first room, connected to a remote group or a collection of remote individuals in separate rooms. The analysis system can receive data from cameras and microphones in the first room and use any of the processes described above to determine individualized audio streams for the people in the group in the first room.

The analysis system can use data, based on the individualized audio streams, to determine which person in the first room is speaking to the remote group or collection of remote individuals. The analysis system can predict when a person in the first room is speaking to another individual in the first room, and not the remote group, or when a person is speaking to the remote group.

The analysis system can communicate with the sensors, speakers, or both, to cause a personalized video conference. For example, the analysis system can communicate with a camera to cause the camera to provide a closer view of the specific person who is speaking, based on the determination of which individualized audio stream is part of the conversation group that includes the remote group of people.

The analysis system, alone or in conjunction with one or more other systems, can provide transcription, live closed-captioning, translations, or two or more of these. The analysis system can provide these features using isolated audio streams for individual voices, e.g., using the audio stream isolation processes described above. For example, an environment may include employees A, B and C in a Virginia office in the US. These employees can be in a video conference with employees D and E in an office in Germany. Further, employee F can also participate in the video conference, connected remotely from their home in Montana. In each office in which a video conference participate is physically located, a camera covers the entire room, and microphones are placed throughout the room to capture audio. Employee F is using a laptop with a webcam.

As employee B speaks, the analysis system causes presentation of a close-up view of employee B on the video screens in the German office and on employee F's laptop. When employee C speaks, the analysis system automatically causes the presentation to switch to a close up of employee C, e.g., the analysis system provides commands to a camera to cause the camera to move from focusing on employee B to focusing on employee C.

The analysis system can also generate an automatically-translated stream in German and cause speakers in the German office to present the translated stream to the employees in Germany. When employee F is not able to hear as well, e.g., identified by settings on employee F's laptop, the analysis system can generate a real-time closed-captioning stream of the conversation and provide the real-time closed captioning stream to employee F's laptop for presentation.

During the meeting, the analysis system detects employee A standing up and walking around the first room while speaking. At times this could make it difficult for remote participants to hear employee A directly as the microphones in the first office detect varying sound levels of employee A's speech. But because of the individualized audio streams, the analysis system is able to separate employee A's speech from other sounds in the first office. This enables the analysis system to provide the German translations and employee F's closed-captioning uninterrupted.

The analysis system can also create a transcription of the video conference. At the end of the meeting, the analysis system can store a full transcription of the meeting. The transcription can include data for each spoken sentence that predicts, e.g., within a threshold likelihood, who spoke the respective sentence.

For situations in which the systems discussed here collect personal information about users, or may make use of personal information, the users may be provided with an opportunity to control whether programs or features collect personal information (e.g., information about a voice signature or face signature, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user. Thus, the user may have control over how information is collected about him or her and used by a system.

Figure 4:
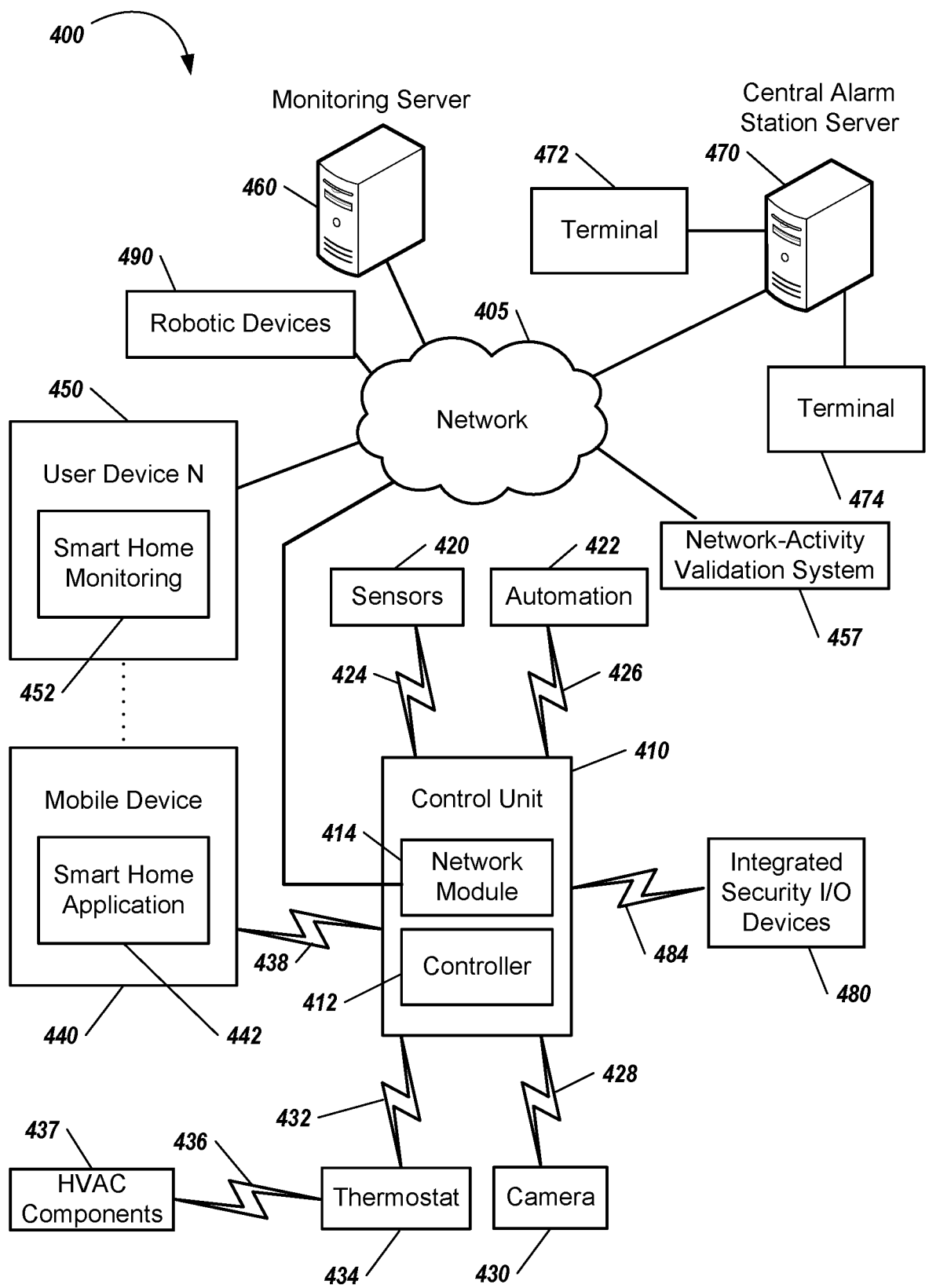
FIG. 4 is a diagram illustrating an example of a home monitoring system.

FIG. 4 is a diagram illustrating an example of a home monitoring system 400. The home monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. Also, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area or video images of the area in which multiple images of the area are captured at a relatively high frequency (e.g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 includes analysis system 457. The analysis system 457 can be computing devices (e.g., a computer, microcontroller, FPGA, ASIC, or other device capable of electronic computation) capable of receiving data related to the analysis system and communicating electronically with the monitoring system control unit 410.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the home monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the home monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system 400 and perform analysis of sensor and image data received from the monitoring system 400. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, the robotic devices 490, and the analysis system 457. The one or more user devices 440 and 450 receive data directly from the sensors 420, the home automation controls 422, the camera 430, the robotic devices 490, and the analysis system 457 and sends data directly to the sensors 420, the home automation controls 422, the camera 430, the robotic devices 490, and the analysis system 457. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, the robotic devices 490, and the analysis system 457 are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, the robotic devices 490, and the analysis system 457 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, the robotic devices 490, and the analysis system 457 to a pathway over network 405 when the one or more user devices 440 and 450 are farther from the sensors 420, the home automation controls 422, the camera 430, the thermostat 434, the robotic devices 490, and the analysis system 457. In some examples, the system leverages GPS information from the one or more user devices 440 and 450 to determine whether the one or more user devices 440 and 450 are close enough to the sensors 420, the home automation controls 422, the camera 430, the thermostat 434, the robotic devices 490, and the analysis system 457 to use the direct local pathway or whether the one or more user devices 440 and 450 are far enough from the sensors 420, the home automation controls 422, the camera 430, the thermostat 434, the robotic devices 490, and the analysis system 457 that the pathway over network 405 is required. In other examples, the system leverages status communications (e.g., pinging) between the one or more user devices 440 and 450 and the sensors 420, the home automation controls 422, the camera 430, the thermostat 434, the robotic devices 490, and the analysis system 457 to determine whether communication using the direct local pathway is possible. If communication using the direct local pathway is possible, the one or more user devices 440 and 450 communicate with the sensors 420, the home automation controls 422, the camera 430, the thermostat 434, the robotic devices 490, and the analysis system 457 using the direct local pathway. If communication using the direct local pathway is not possible, the one or more user devices 440 and 450 communicate with the sensors 420, the home automation controls 422, the camera 430, the thermostat 434, the robotic devices 490, and the analysis system 457 using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A method comprising:
determining that a first person is wearing a hearing aid, by detecting, using image recognition performed on images captured by a camera, an appearance of the hearing aid in the images;
in response to detecting the appearance of the hearing aid in the images, determining, from one or more of the images captured by the camera depicting both the first person and a second person, that the second person is speaking to the first person by determining that a distance between the first person and the second person satisfies a threshold distance;
determining an audio stream for an environment in which the first person is located;
determining whether more than one sound stream is encoded in the audio stream;
based on determining that more than one sound stream is encoded in audio data, identifying a portion of captured sounds that corresponds to the second person speaking to the first person; and
providing, to the hearing aid, audio data that increases a volume of the portion of captured sounds relative to other portions of the captured sounds.

2. The method of claim 1, wherein determining whether more than one sound stream is encoded in the audio stream comprises:
determining whether the audio stream includes a first sound stream that corresponds to the second person speaking to the first person and a second sound stream that corresponds to a third person speaking to a fourth person.

3. The method of claim 2, wherein determining whether the audio stream includes the first sound stream that corresponds to the second person speaking to the first person and the second sound stream that corresponds to the third person speaking to the fourth person comprises:

determining, from the images, that the third person is speaking to the fourth person in the environment.

4. The method of claim 1, wherein determining whether more than one sound stream is encoded in the audio stream comprises:
determining, from the audio stream, that the audio stream includes i) a first sound stream that corresponds to the second person speaking to the first person and ii) a second sound stream including speech being spoken with a voice that does not belong to the first person and does not belong to the second person.

5. The method of claim 1, based on determining that more than one sound stream is encoded in the audio data, identifying the portion of captured sounds that corresponds to the second person speaking to the first person comprises:
identifying a portion of speech in the captured sounds that matches a voice of the second person.

6. The method of claim 1, wherein determining, from the one or more of the images captured by the camera, that the second person is speaking to the first person comprises:
determining, from the one or more of the images, that the first person and the second person are within the threshold distance from each other and are facing each other.

7. The method of claim 1, wherein determining the audio stream for the environment in which the first person is located comprises:
identifying a microphone in the environment in which the first person is located; and
obtaining the audio stream from the microphone that was identified.

8. The method of claim 1, wherein determining that the first person is wearing the hearing aid comprises:
detecting a presence of the hearing aid through network discovery; and
determining that the first person is wearing the hearing aid based on one or more of audio captured by the hearing aid or the images.

9. The method of claim 1, wherein providing, to the hearing aid, audio data that increases the volume of the portion of captured sounds relative to other portions of the captured sounds comprises at least one of:
reducing a volume of the captured sounds that do not correspond to the second person speaking to the first person; or
increasing the volume of the portion of the captured sounds that correspond to the second person speaking to the first person.

10. The method of claim 1, comprising:
based on determining that more than one sound stream is not encoded in subsequent audio data, determining to skip emphasis of any portion of the audio stream.

11. A system comprising:
one or more computers and one or more storage devices storing instructions that are operable, when executed by the one or more computers, to cause the one or more computers to perform operations comprising:
determining that a first person is wearing a hearing aid, by detecting, using image recognition performed on images captured by a camera, an appearance of the hearing aid in the images;
in response to detecting the appearance of the hearing aid in the images, determining, from one or more of the images captured by the camera depicting both the first person and a second person, that the second person is speaking to the first person by determining that a distance between the first person and the second person satisfies a threshold distance;
determining an audio stream for an environment in which the first person is located;
determining whether more than one sound stream is encoded in the audio stream;
based on determining that more than one sound stream is encoded in audio data, identifying a portion of captured sounds that corresponds to the second person speaking to the first person; and
providing, to the hearing aid, audio data that increases a volume of the portion of captured sounds relative to other portions of the captured sounds.

12. The system of claim 11, wherein determining whether more than one sound stream is encoded in the audio stream comprises:
determining whether the audio stream includes a first sound stream that corresponds to the second person speaking to the first person and a second sound stream that corresponds to a third person speaking to a fourth person.

13. The system of claim 12, wherein determining whether the audio stream includes the first sound stream that corresponds to the second person speaking to the first person and the second sound stream that corresponds to the third person speaking to the fourth person comprises:
determining, from the images, that the third person is speaking to the fourth person in the environment.

14. The system of claim 11, wherein determining whether more than one sound stream is encoded in the audio stream comprises:
determining, from the audio stream, that the audio stream includes i) a first sound stream that corresponds to the second person speaking to the first person and ii) a second sound stream including speech being spoken with a voice that does not belong to the first person and does not belong to the second person.

15. The system of claim 11, based on determining that more than one sound stream is encoded in the audio data, identifying the portion of captured sounds that corresponds to the second person speaking to the first person comprises:
identifying a portion of speech in the captured sounds that matches a voice of the second person.

16. The system of claim 11, wherein determining, from the one or more of the images captured by the camera, that the second person is speaking to the first person comprises:
determining, from the one or more of the images, that the first person and the second person are within the threshold distance from each other and are facing each other.

17. The system of claim 11, wherein determining the audio stream for the environment in which the first person is located comprises:
identifying a microphone in the environment in which the first person is located; and
obtaining the audio stream from the microphone that was identified.

18. A non-transitory computer-readable medium storing software comprising instructions executable by one or more computers which, upon such execution, cause the one or more computers to perform operations comprising:
determining that a first person is wearing a hearing aid, by detecting, using image recognition performed on images captured by a camera, an appearance of the hearing aid in the images;
in response to detecting the appearance of the hearing aid in the images, determining, from the one or more of the images captured by the camera depicting both the first person and a second person, that the second person is speaking to the first person by determining that a distance between the first person and the second person satisfies a threshold distance;

determining an audio stream for an environment in which the first person is located;

determining whether more than one sound stream is encoded in the audio stream;

based on determining that more than one sound stream is encoded in audio data, identifying a portion of captured sounds that corresponds to the second person speaking to the first person; and providing, to the hearing aid, audio data that increases a volume of the portion of captured sounds relative to other portions of the captured sounds.

\* \* \* \* \*